Patented Aug. 5, 1930

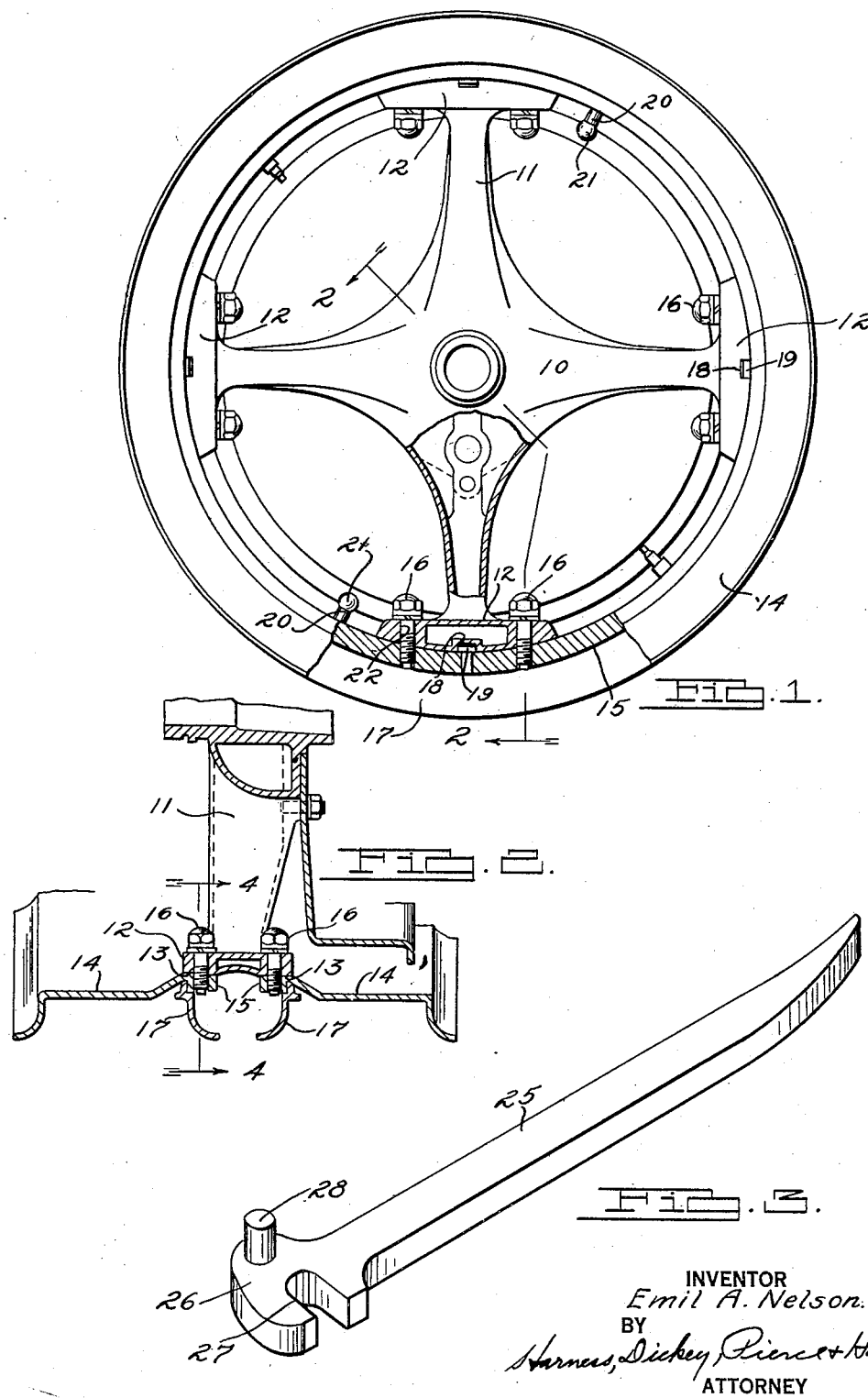

1,772,192

UNITED STATES PATENT OFFICE

EMIL A. NELSON, OF DETROIT, MICHIGAN

RIM WRENCH FOR WHEELS

Original application filed March 26, 1928, Serial No. 264,748. Patent No. 1,744,915, dated January 28, 1930. Divided and this application filed January 15, 1930. Serial No. 420,828.

This invention relates to wrenches, and particularly to wrenches constructed for use in connection with rims removably received upon wheels, and is a division of my application for Letters Patent of the United States filed March 26, 1928, Serial Number 264,748, Patent Number 1,744,915, January 28, 1930, for improvements in wheels.

The principal object of the present invention is to provide a wrench of novel construction for use in applying and removing a rim from a wheel.

Another object is to provide a wrench for use in connection with a rim engageable with a wheel circumferentially thereof, the wrench being so constructed as to enable it to cooperate between the wheel and the rim in order to force the rim on to or from the wheel.

Another object is to provide, in combination with a felloeless type of wheel provided with a rim secured to the ends of the spokes by radially extending bolts, a wrench provided with means for engaging the wheel in an opening provided for the radial bolts upon removal of the bolts, and further formed to engage means integral with the rim whereby to enable the wrench to co-operate between the wheel and rim to force the rim on or off of the wheel.

Other objects will be apparent in the following specification, reference being had to the accompanying drawings, in which Fig. 1 is a side elevation of a wheel.

Fig. 2 is a fragmentary sectional view taken as on the line 2—2 of Fig. 1.

Fig. 3 is a perspective view of a wrench employed in applying or removing the rim to or from the wheel.

Figure 4:
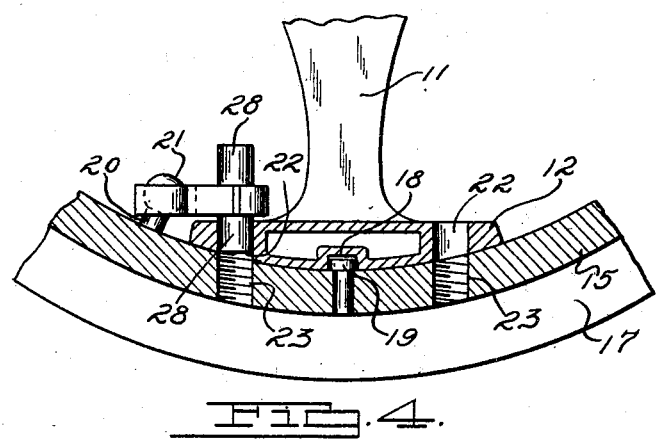
Fig. 4 is a fragmentary sectional view taken as on the line 4—4 of Fig. 2 but showing the fastening bolts removed and the wrench shown in Fig. 3 positioned in operative relationship with respect to the rim and wheel.
Figure 5:
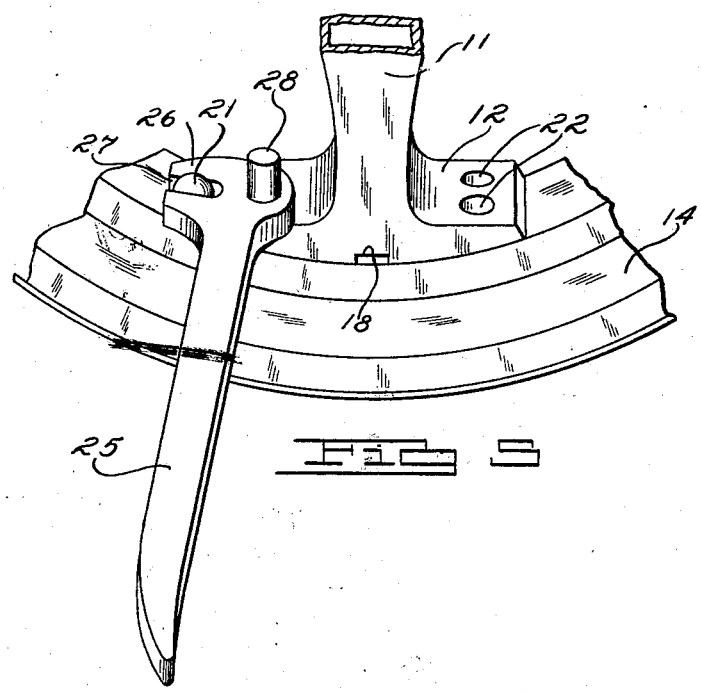
Fig. 5 is a fragmentary perspective view showing the application of the wrench to the rim and wheel for the purpose of applying or removing the rim.

I show in Fig. 1 a wheel comprising a hub portion 10 having four integral radial extending spokes 11, each of which terminates at its outer end in a pad 12. The end surface of each pad 12 is formed to provide two axially spaced rim receiving seats 13 (see Fig. 2), whose surfaces are formed as a part of a cylindrical surface having its axis coincident with the axis of the hub 10. The corresponding seats 13 on each side of the wheel serve as seats for a rim 14, and the rims 14 are secured to the seats in opposed relationship, as indicated in Fig. 2. Each rim has an inwardly projecting marginal thickened portion 15, the inner surface of which is formed to cylindrical shape and is adapted to be received upon the corresponding rim seats 13. Two bolts 16 positioned in generally radial relation with respect to the wheel extend through openings 22 in each pad 12 in line with each of the seats 13 and are threaded into openings 23 in the thickened portion 15 of the corresponding rim 14 in order to secure the rim to the wheel. Each rim may be provided with a removable flange ring 17 as in conventional practice.

The outer surface of each pad 12 is preferably provided with a slot 18 extending in parallel relation to the axis of the wheel, and the rim 14 is provided with an inwardly projecting headed pin 19 which is adapted to be received in the slot 18 so as to properly locate the holes in the rim with the holes in the pads in order to facilitate the application of the bolts 16 to the wheel.

It is preferable that the inside diameter of the thickened portion 15, which is received upon the seats 13, be slightly smaller than the effective external diameter of the seats 13 so that in applying the rim to the wheel the rim must be pressed upon the seats 13. For this reason it is desirable that some means be provided permitting ready application of the rim to the wheel and ready removal of the same therefrom when desired. In this respect it is desired to point out that even though the internal diameter of the thickened portions 15 of the rims were of slightly larger diameter than the effective diameter of the rim seats, unless the rim was maintained in absolutely true circular form it would still be necessary to force the rim on and off of the wheel, in which case it is equally desirable that some means be provided to facilitate such application and removal of the rim.

The means provided in accordance with the present invention consists of a wrench of novel formation that is adapted to co-operate with the openings 22 in the pad 12 upon removal of the bolts 16. For the purpose of employing this wrench, I secure to the rim 14 at points adjacent diametrically opposite pads 12 a stud member 20 extending inwardly of the rim and terminating in a ball head 21. The wrench comprises a bar member having a shank portion 25 terminating at one end in a relatively flat head 26, one side of which is provided with a slot 27 extending perpendicularly to the length of the shank 25. On the side opposite the slot 27 I provide oppositely extending pins 28 which are shown as being substantially in line with the slot 27 and disposed in perpendicular relationship with respect to the top and bottom surfaces of the head 26. The pins 28 are of a diameter to relatively closely but rotatably fit in the openings 22 in the pads 12 upon removal of the corresponding bolts 16, and when in such position the wrench may be positioned so that the adjacent ball member 21 is received within the slot 27 in the wrench. It will thus be apparent that the wrench is thus pivotally mounted relative to the corresponding pad 12 and that upon rotation of the wrench about the pins 28 the slotted part of the wrench in rotating and simultaneously engaging the ball member 21 will force the rim either on or off of the corresponding pad 12, depending upon the direction of rotation of the wrench. It will also be apparent that by providing the pins 28 projecting from both sides of the wrench, the wrench may be reversed when necessary without affecting its operativeness. The leverage which it is possible to obtain in a wrench of this type is very great and permits rims to be easily and quickly applied to or removed from the wheel in spite of a relatively large difference in the diameter of the rim and the co-operating rim seats.

While I have shown each rim as being provided with but two ball members 21, it will be obvious that any number may be supplied on each rim that is found necessary or desirable. It will also be apparent that the particular ball member 21 shown is merely one form of a means that may be formed on a rim for co-operation with a wrench of this type, and that this member may be modified to take a number of various forms of construction without affecting the broad invention involved.

These and other formal changes may be made in the specific embodiment of the invention described without departing from the spirit and substance of the broad invention, the scope of which is commensurate with the appended claims.

What I claim is:

1. A rim wrench comprising a shank and an integral head thereon, said head having two opposite surfaces extending in the same plane and common with two opposite surfaces of the shank, said head projecting transversely of said shank on both sides thereof between said two opposite surfaces forming two transverse projections, a pin, whereby the wrench pivots on said wheel, on each of said opposite surfaces of one of said projections, said pins extending perpendicularly to said surfaces, the other of said projections having a slot therein extending in a direction perpendicular to the longitudinal axis of said shank.

2. A rim wrench for a felloeless wheel comprising a shank and an integral head thereon, said head having two opposite flat surfaces extending in the same plane and common with two opposite surfaces of the shank, said head projecting transversely of said shank on both sides thereof between said two opposite surfaces forming two transverse projections, a cylindrical pin, whereby the wrench pivots on said wheel, on each of said opposite surfaces of one of said projections, said pins extending perpendicularly to said surfaces, the other of said projections having a slot therein extending in a direction perpendicular to the longitudinal axis of said shank.

3. A rim wrench for use with a felloeless wheel and rim therefor comprising a shank and an integral head thereon, said head having two opposite flat surfaces extending in the same plane and common with two opposite surfaces of the shank, said head projecting transversely of said shank on both sides thereof between said two opposite surfaces forming two transverse projections, a cylindrical pivot pin, whereby the wrench pivots on said wheel, on each of said opposite surfaces of one of said projections, said pins extending perpendicularly to said surfaces, the other of said projections having a slot therein, the plane of symmetry of said slot extending in a direction perpendicular to the longitudinal axis of said shank and containing the axis of said pins, whereby the rim is held firmly by the slot as it is moved from the felloeless wheel.

4. A rim wrench having in combination a T-shaped body, the leg of the T comprising a shank, one arm of the head of the T comprising a lug engaging portion having a longitudinal slot therein, and a recess engaging portion comprising a perpendicular pivot pin on the surface of the other arm of the head of the T.

5. A T-shaped rim wrench having in combination a shank member and two arm members having common upper and lower surfaces, one of said arm members having a medial slot running longitudinally through the common surfaces thereof and a pivot pin extending from the other of said arm members perpendicular to the common surface thereof.

6. A rim wrench having in combination a T-shaped body, the leg of the T comprising a shank, one arm of the head of the T comprising a lug engaging portion having a longitudinal slot therein, and a recess engaging portion comprising a perpendicular pivot pin on the surface of the other arm of the head of the T, the axis of said pin, and the longitudinal axis of said shank being substantially perpendicular to and spaced from each other, the longitudinal axis of said slot intersecting both the axis of said shank and said pin and being substantially perpendicular to both said axes.

7. A T-shaped rim wrench having in combination a shank member and two arm members having common upper and lower surfaces, one of said arm members having a medial slot running longitudinally through the common surfaces thereof and a pivot pin extending from the other of said arm members perpendicular to the common surface thereof, the axis of said pin, and the longitudinal axis of said shank being substantially perpendicular to and spaced from each other, the longitudinal axis of said slot intersecting both the axis of said shank and said pin and being substantially perpendicular to both said axes.

8. A rim wrench for a demountable rim wheel comprising a shank and a head, said head comprising a yoke and a pivot pin arranged in substantial alignment transversely of the length of said shank, said yoke adapted for engagement with a projection on said rim and said pin adapted for pivotal reception in an opening in said wheel.

EMIL A. NELSON.